United States Patent
Sakai et al.

(10) Patent No.: US 10,743,668 B2
(45) Date of Patent: Aug. 18, 2020

(54) INTAKE/EXHAUST VALVE DEVICE AND VEHICULAR SEAT DEVICE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Makoto Sakai, Anjo (JP); Ryosuke Mizuno, Toyota (JP); Tomokazu Seki, Kariya (JP); Katsuya Nozue, Toyohashi (JP); Shunsuke Tanaka, Nisshin (JP); Kenji Hashimoto, Nisshin (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 24 days.

(21) Appl. No.: 16/324,690

(22) PCT Filed: Sep. 13, 2017

(86) PCT No.: PCT/JP2017/033124
§ 371 (c)(1),
(2) Date: Feb. 11, 2019

(87) PCT Pub. No.: WO2018/056144
PCT Pub. Date: Mar. 29, 2018

(65) Prior Publication Data
US 2019/0216223 A1    Jul. 18, 2019

(30) Foreign Application Priority Data
Sep. 23, 2016   (JP) ................................ 2016-186099

(51) Int. Cl.
*A47C 7/72*     (2006.01)
*A47C 7/02*     (2006.01)
(Continued)

(52) U.S. Cl.
CPC .................. *A47C 7/02* (2013.01); *A47C 7/46* (2013.01); *B60N 2/42* (2013.01); *B60N 2/68* (2013.01); *B60N 2/90* (2018.02)

(58) Field of Classification Search
CPC .... B60N 2/5657; B60N 2/5664; B60N 2/665; A47C 7/74
See application file for complete search history.

(56) References Cited

U.S. PATENT DOCUMENTS

| | | | | |
|---|---|---|---|---|
| 4,840,425 A | * | 6/1989 | Noble | .................... A47C 7/467 297/284.1 |
| 5,711,575 A | * | 1/1998 | Hand | .................... A47O 7/425 297/284.6 |

(Continued)

FOREIGN PATENT DOCUMENTS

| EP | 2 607 157 A1 | 6/2013 |
|---|---|---|
| JP | 57-148 Y2 | 1/1982 |

(Continued)

OTHER PUBLICATIONS

International Search Report dated Dec. 12, 2017 in PCT/JP2017/033124 filed Sep. 13, 2017.

*Primary Examiner* — Shin H Kim
(74) *Attorney, Agent, or Firm* — Oblon, McClelland, Maier & Neustadt, L.L.P.

(57) ABSTRACT

An inlet-outlet valve device includes a main body configured in such a manner that an air tube having an air flow passage is coupled to the main body and a first securing portion and a second securing portion secured to a retaining member located inside a seat. The first securing portion is secured to a first position on the retaining member with a first securing portion fastening member. The second securing portion is secured to a second position on the retaining member via a second securing portion fastening member. The second securing portion includes an insertion hole (Continued)

through which the second securing portion fastening member is inserted. The insertion hole is an elongated hole extending in a direction that connects the first securing portion and the second securing portion to each other.

13 Claims, 11 Drawing Sheets

(51) Int. Cl.
*A47C 7/46* (2006.01)
*B60N 2/90* (2018.01)
*B60N 2/68* (2006.01)
*B60N 2/42* (2006.01)

(56) References Cited

U.S. PATENT DOCUMENTS

| | | | | |
|---|---|---|---|---|
| 6,048,024 A * | 4/2000 | Wallman | ............... | A47C 7/74 |
| | | | | 297/180.14 |
| 7,261,372 B2 * | 8/2007 | Aoki | ............... | B60N 2/5657 |
| | | | | 297/180.14 |
| 7,425,034 B2 * | 9/2008 | Bajic | ............... | B60N 2/5635 |
| | | | | 297/180.12 |
| 7,963,595 B2 * | 6/2011 | Ito | ............... | B60N 2/809 |
| | | | | 297/180.14 |
| 8,162,398 B2 * | 4/2012 | Colja | ............... | A61H 9/0078 |
| | | | | 297/284.4 |
| 8,727,434 B2 * | 5/2014 | Sahashi | ............... | B60N 2/5635 |
| | | | | 297/180.13 |
| 9,662,962 B2 * | 5/2017 | Steinman | ............ | B60H 1/00564 |
| 10,293,725 B2 * | 5/2019 | Benthaus | ............... | B60N 2/976 |
| 10,399,470 B2 * | 9/2019 | Kobayashi | ............... | B60N 2/70 |
| 10,543,762 B2 * | 1/2020 | Ui | ............... | B60N 2/58 |
| 10,625,643 B2 * | 4/2020 | Iacovone | ............. | B60N 2/5628 |
| 2008/0129089 A1 * | 6/2008 | Krobok | ............... | B60N 2/976 |
| | | | | 297/180.13 |
| 2010/0244504 A1 | 9/2010 | Colja et al. | | |
| 2014/0167460 A1 * | 6/2014 | Prexl | ............... | B60N 2/914 |
| | | | | 297/217.1 |
| 2014/0232155 A1 * | 8/2014 | Bocsanyi | ............... | A47C 4/54 |
| | | | | 297/284.6 |
| 2017/0036575 A1 | 2/2017 | Kobayashi et al. | | |

FOREIGN PATENT DOCUMENTS

| | | |
|---|---|---|
| JP | 3-8850 Y2 | 3/1991 |
| JP | 6-55577 B2 | 7/1994 |
| JP | 2004-47835 A | 2/2004 |
| JP | 2013-129245 A | 7/2013 |
| JP | 2013-129250 A | 7/2013 |
| JP | 2015-150967 A | 8/2015 |
| WO | WO 2015/156218 A1 | 10/2015 |

* cited by examiner

When no load is applied

When load is applied

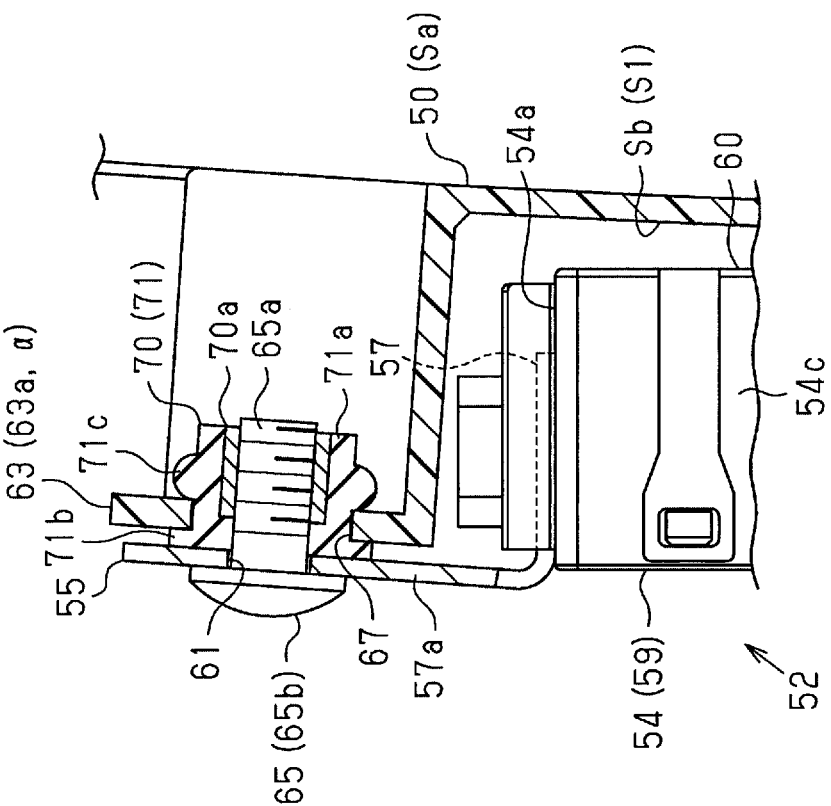
Fig.9A When no load is applied
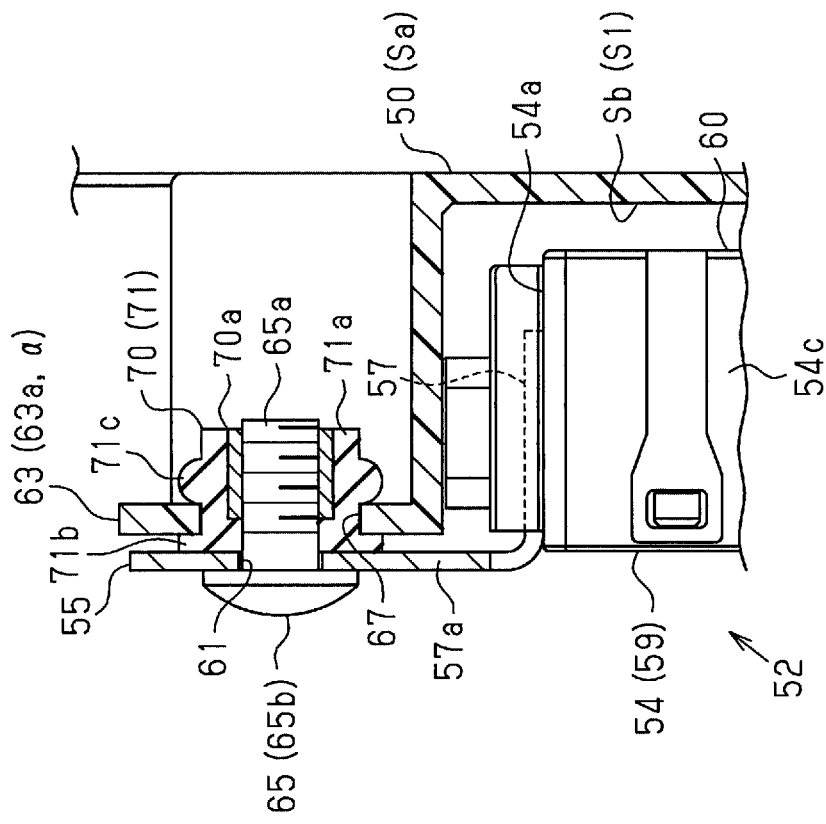
Fig.9B When load is applied

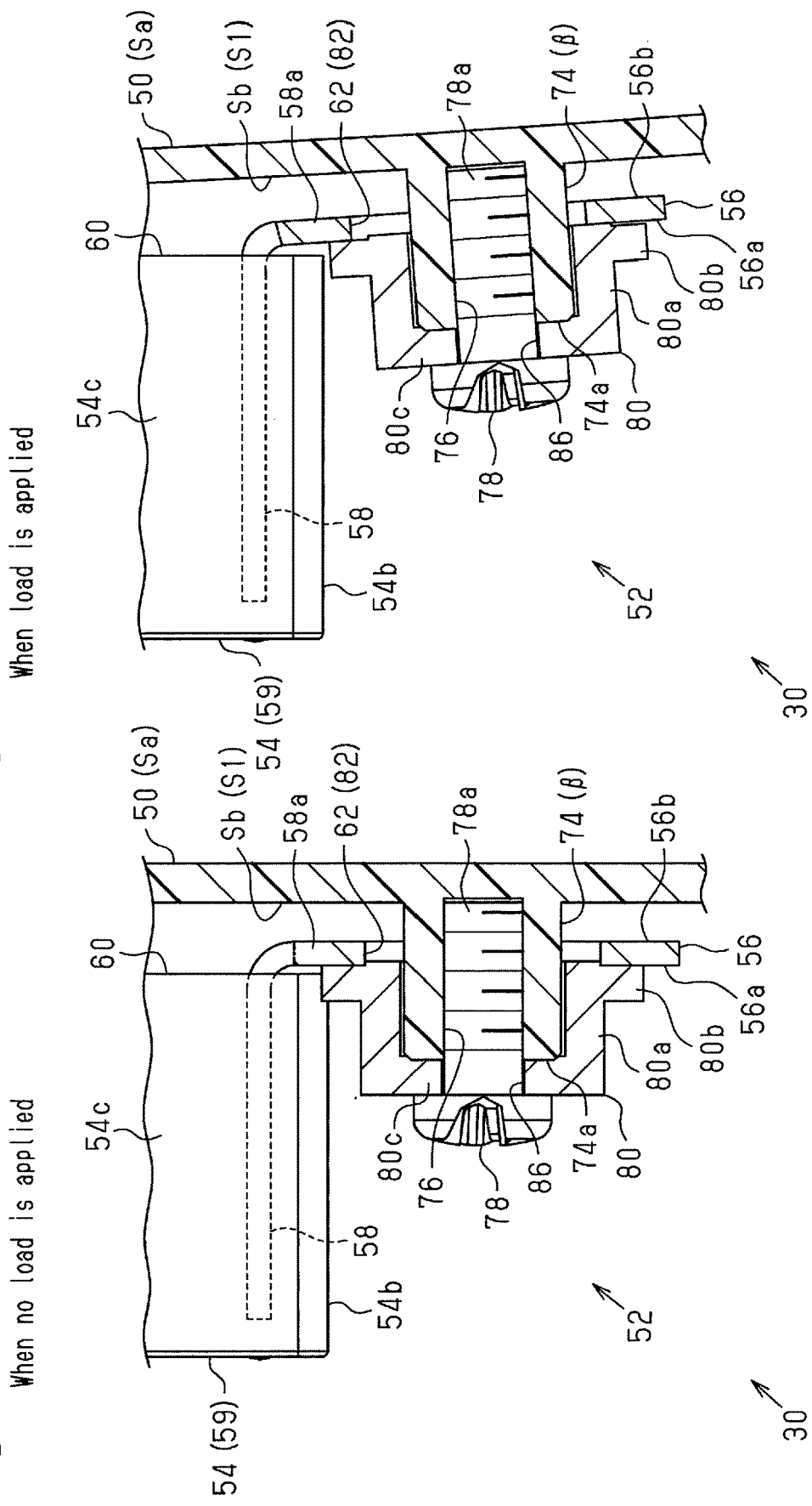

INTAKE/EXHAUST VALVE DEVICE AND VEHICULAR SEAT DEVICE

TECHNICAL FIELD

The present invention relates to an inlet-outlet valve device and a vehicle seat device.

BACKGROUND ART

Conventionally, some vehicle seat devices give massage effect to the occupant seated in the seat. In such seat device, airbags (bladders) provided inside the seat expand and contract, so that the support shape of the seat is changed, or the expanding and contracting airbags press the seat cover from inside to give massage effect.

In general, in such a seat device, the airbags are connected to an air pump device through flexible air tubes. Additionally, an inlet-outlet valve device is provided in the middle of the flow passages in the air tubes. The inlet-outlet valve device controls suction and discharge of air with respect to the airbags. For example, in the seat device disclosed in Patent Document 1, the inlet-outlet valve device (control unit) is secured to the side frame of a backrest.

PRIOR ART DOCUMENT

Patent Document

Patent Document 1: Japanese Laid-Open Patent Publication No. 2013-129245

SUMMARY OF THE INVENTION

Problems that the Invention is to Solve

That is, the side frame, which has a high rigidity, is used as securing section to which the inlet-outlet valve device is secured, so that the inlet-outlet valve device is stably retained inside the seat, on which a seating load (seat load) of the occupant is applied. However, many other devices such as the air pump device, a reclining motor, or a side airbag device are located inside the seat. These devices are also required to be retained in a stable manner like the inlet-outlet valve device. That is, when the inlet-outlet valve device is secured to the side frame as described above, the inlet-outlet valve device is required to be located in a limited space while avoiding interference with these devices. If the position of the inlet-outlet valve device is changed to avoid such interference, the inlet-outlet valve device is required to be stably retained at a position susceptible to the seat load. In this respect, there is still room for improvement.

Accordingly, it is an objective of the present invention to provide an inlet-outlet valve device and a vehicle seat device that permit the inlet-outlet valve device to be retained in a more stable manner.

Means for Solving the Problems

To achieve the foregoing objective, an inlet-outlet valve device is provided that includes a main body configured in such a manner that an air tube having an air flow passage is coupled to the main body and a first securing portion and a second securing portion secured to a retaining member located inside a seat. The first securing portion is secured to a first position on the retaining member with a first securing portion fastening member. The second securing portion is secured to a second position on the retaining member via a second securing portion fastening member. The second securing portion includes an insertion hole through which the second securing portion fastening member is inserted. The insertion hole is an elongated hole extending in a direction that connects the first securing portion and the second securing portion to each other.

To achieve the foregoing objective, a vehicle seat device is provided that includes a retaining member located inside a seat and an inlet-outlet valve device retained by the retaining member. The inlet-outlet valve device includes a main body to which an air tube having an air flow passage is coupled and a first securing portion and a second securing portion secured to the retaining member. The first securing portion is secured to a first position on the retaining member with a first securing portion fastening member. The second securing portion is secured to a second position on the retaining member via a second securing portion fastening member. The second position on the retaining member or the second securing portion includes an insertion hole. The second securing portion fastening member, which secures the second securing portion to the second position, is inserted in the insertion hole. The insertion hole extends in a direction that connects the first securing portion and the second securing portion.

BRIEF DESCRIPTION OF THE DRAWINGS

FIG. 9A is an enlarged cross-sectional view of the first securing portion secured to a first position on the retaining member and the surrounding part when no load is applied.

FIG. 9B is an enlarged cross-sectional view of the first securing portion secured to the first position on the retaining member and the surrounding part when a load is applied.

FIG. 10A is an enlarged cross-sectional view of the second securing portion secured to a second position on the retaining member and the surrounding part when no load is applied.

FIG. 10B is an enlarged cross-sectional view of the second securing portion secured to the second position on the retaining member and the surrounding part when a load is applied.

MODES FOR CARRYING OUT THE INVENTION

Hereinafter, a seat device that has a pneumatic seat support function and a massage function and an inlet-outlet valve device according to one embodiment will be described with reference to the drawings.

Figure 1:
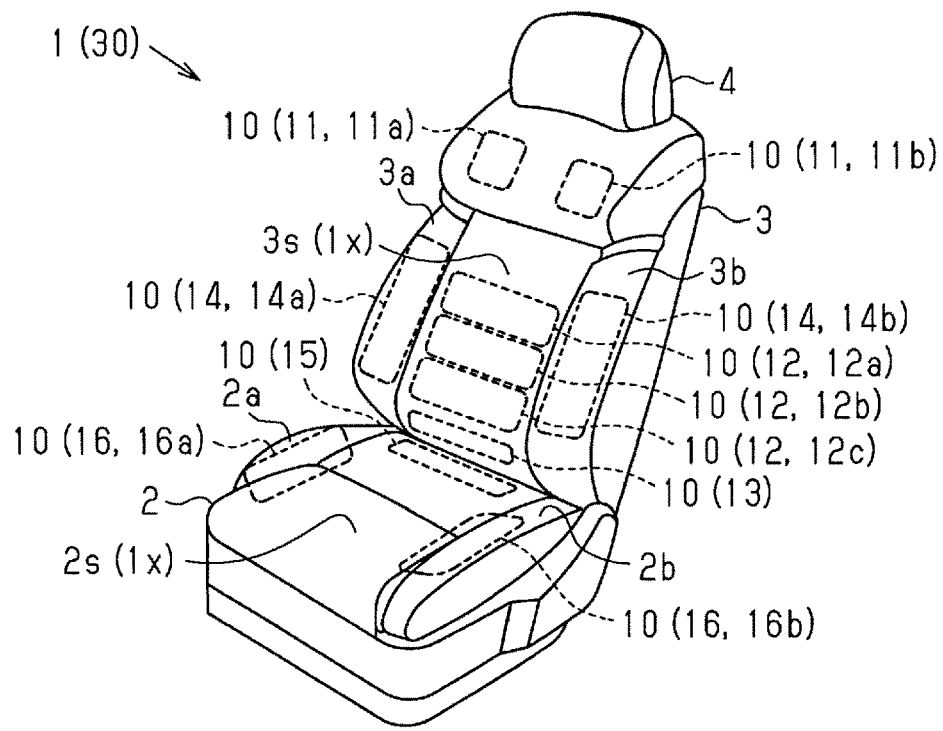
FIG. 1 is a perspective view of a vehicle seat in which seat support airbags are provided.
Figure 2:
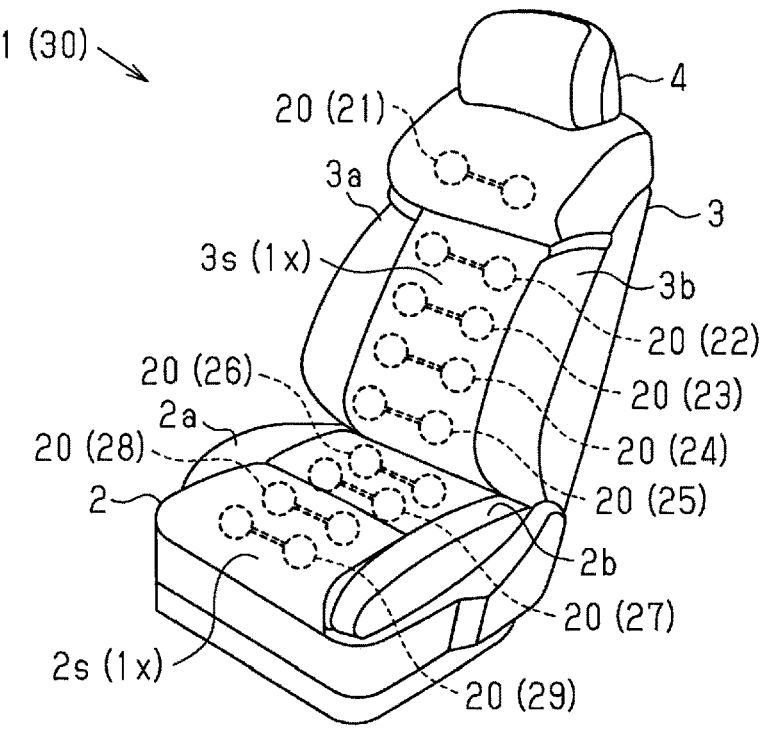
FIG. 2 is a perspective view of a vehicle seat in which massage airbags are provided.

As shown in FIGS. 1 and 2, a vehicle seat 1 includes a seat cushion 2 and a backrest 3, which is provided on the rear end portion of the seat cushion 2. A headrest 4 is provided on the upper end of the backrest 3.

The seat 1 of the present embodiment includes side portions 3a, 3b each provided on one side of the backrest 3. The side portions 3a, 3b bulge forward. The seat 1 further includes side portions 2a, 2b each provided on one side of the seat cushion 2. The side portions 2a, 2b bulge upward. The seat 1 of the present embodiment allows the occupant to sit in a good seating position and to maintain the seating position.

The seat 1 is also provided with airbags 10 (11 to 16), which expand and contract inside the seat cushion 2 and the backrest 3 to change the surface shape of the seat 1. Furthermore, the seat 1 is provided with airbags 20 (21 to 29), which also expand and contract inside the seat cushion 2 and the backrest 3 to press a seat cover 1x from inside. In the present embodiment, this configuration provides a seat device 30 that is capable of changing the support shape of the seat 1 and applying massage effect (refreshing effect) to the occupant seated in the seat 1.

More specifically, as shown in FIG. 1, independent seat support airbags 11 (11a, 11b), 12 (12a to 12c), and 13 are provided inside the backrest 3 of the seat 1 of the present embodiment at positions corresponding to the shoulder regions, the lumbar region, and the lower end portion (back pelvis) of a backrest surface 3s. Furthermore, independent seat support airbags 14 (14a, 14b) are provided at positions corresponding to the side portions 3a, 3b of the backrest 3. The seat cushion 2 is also provided with independent seat support airbags 15 and 16 (16a, 16b) located inside the rear end portion (cushion pelvis) of a seating surface 2s and inside the side portions 2a, 2b.

Furthermore, as shown in FIG. 2, independent massage (refreshing) airbags 21 to 25 are provided inside the backrest 3 and are arranged in the vertical direction along the shoulder regions, the lumbar region, and the lower end portion (back pelvis) of the backrest surface 3s. The airbags 20 for massage in the seat 1 of the present embodiment each include a pair of airbags spaced apart from each other in the seat lateral direction. The pair of airbags is connected to each other to expand and contract integrally. The seat cushion 2 is also provided with independent massage airbags 26 to 29 arranged in the fore-and-aft direction below the seating surface 2s.

Figure 3:
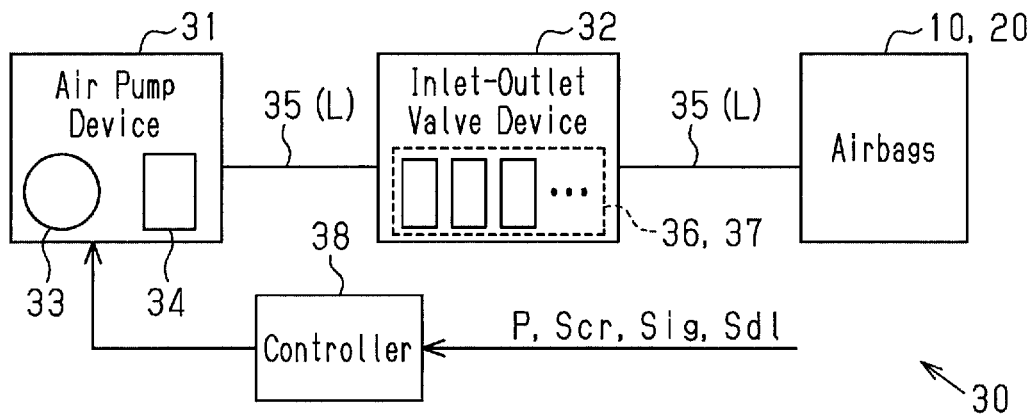
FIG. 3 is a schematic diagram of a seat device.

As shown in FIG. 3, the seat device 30 of the present embodiment includes an air pump device 31, which forces air to be supplied to the airbags 10 and 20, and an inlet-outlet valve device 32 located between the airbags 10 and 20 and the air pump device 31. The air pump device 31 of the present embodiment is an electric pump that drives a pump mechanism 34 using a motor 33 as a drive source. Furthermore, the inlet-outlet valve device 32 is connected to the airbags 10 and 20 and the air pump device 31 through plastic air tubes 35 having flexibility. That is, the seat device 30 of the present embodiment includes an air flow passage L provided by the air tubes 35 and an internal passage of the inlet-outlet valve device 32. The air flow passage L communicates with the airbags 10 and 20 and the air pump device 31. The inlet-outlet valve device 32 of the present embodiment includes intake valves 36 and exhaust valves 37 located in the middle of the flow passage L.

Furthermore, the operation of the intake valves 36, the exhaust valves 37, and the air pump device 31 in the seat device 30 of the present embodiment is controlled by a controller 38. More specifically, the controller 38 of the present embodiment receives an internal pressure P of the airbags 10 and 20 and signals to non-illustrated operation switches such as an operation input signal Scr, an ignition signal Sig, and a door lock signal Sdl. The controller 38 of the present embodiment is configured to control the operation of the intake valves 36, the exhaust valves 37, and the air pump device 31 to expand and contract the airbags 10 and 20 based on the control signals.

Figure 4:
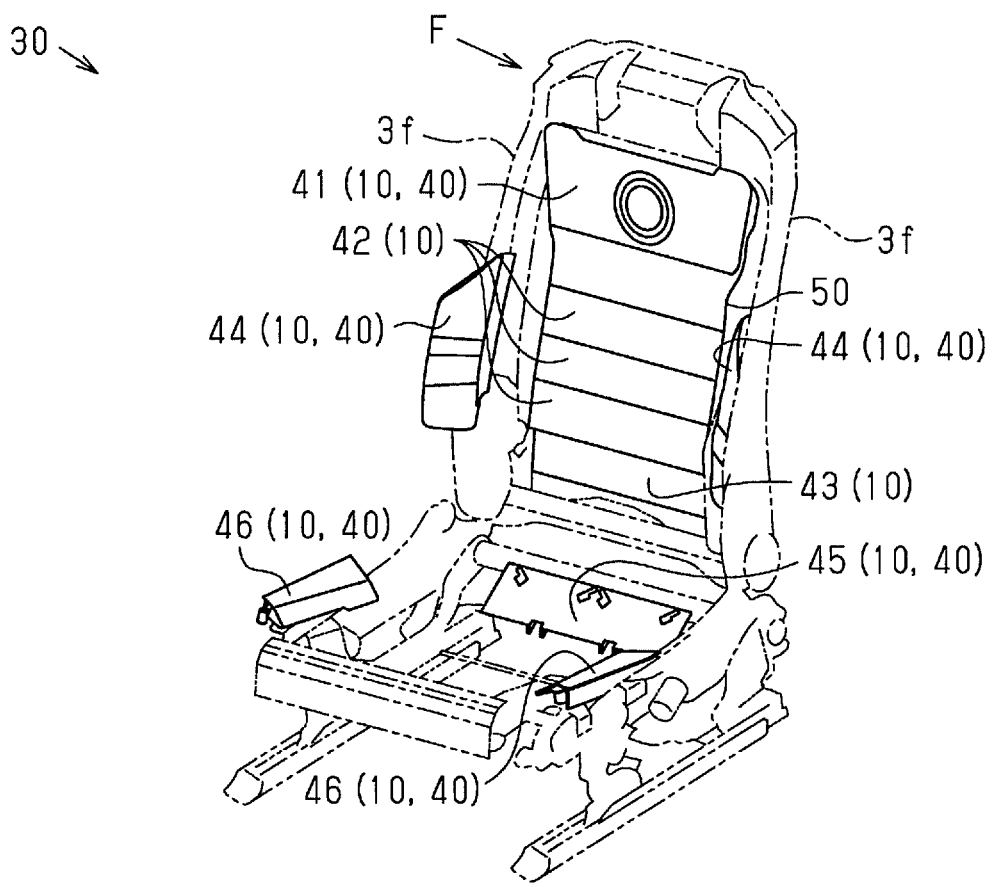
FIG. 4 is a perspective view of seat support devices and a retaining member located inside the seat.

As shown in FIG. 4, in the seat device 30 of the present embodiment, the airbags 10 for seat support configure seat support devices 41 to 46 that press a cushion pad (not shown) of the seat 1 from inside. More specifically, the seat support devices 41, 44 to 46 corresponding to the shoulders, the back sides, the cushion pelvis, and the cushion sides each include the airbag(s) 10 (11, 14 to 16) and a paddle member 40, which serves as a pressing member, integrated with each other. Furthermore, the seat support devices 42 and 43 corresponding to the lumbar region and the back pelvis are configured in such a manner that the airbags 10 (12, 13) directly press the cushion pad of the seat 1. The seat device 30 of the present embodiment is configured in such a manner that the seat support devices 41 to 46 change the seat support shape at the positions where they are located.

Figure 5B:
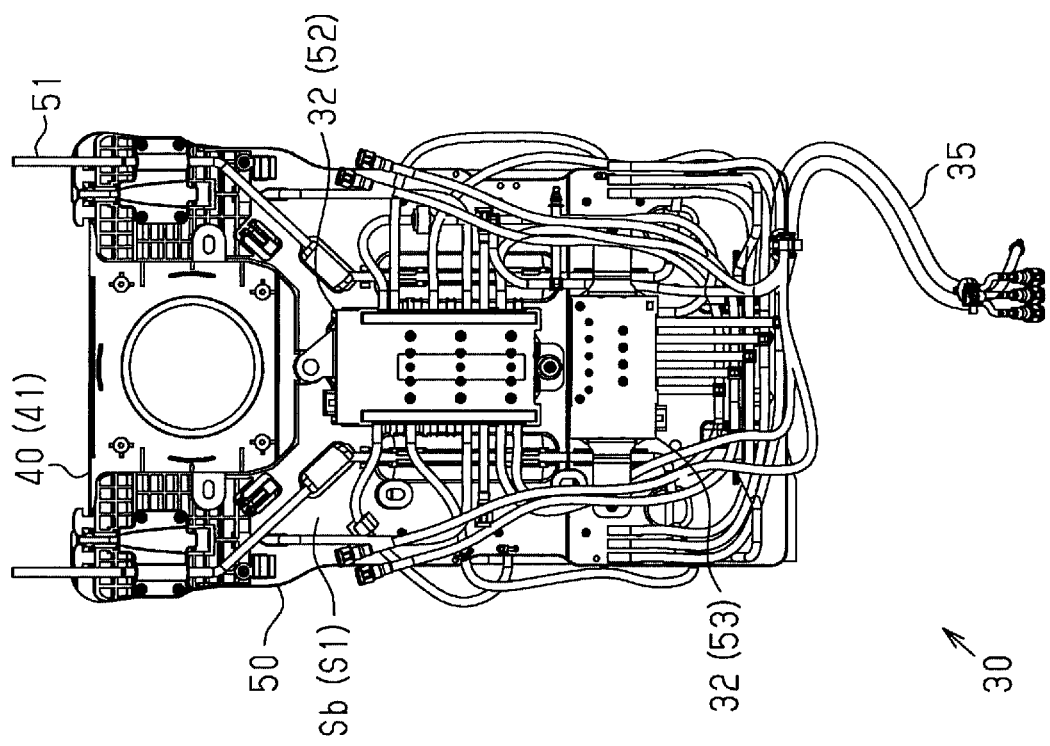
FIG. 5B is a rear view of the retaining member.
Figure 5A:
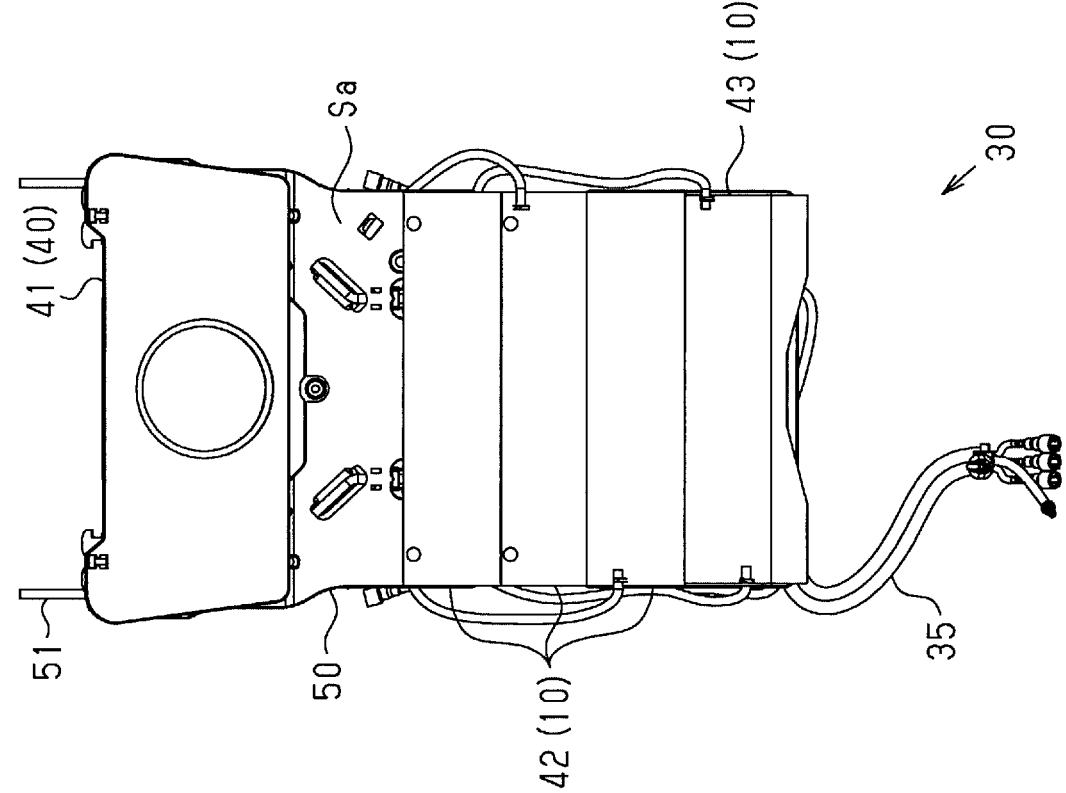
FIG. 5A is a front view of the retaining member to which components of the seat device are mounted.

More specifically, as shown in FIGS. 4, 5A, and 5B, the seat device 30 of the present embodiment includes a substantially tabular retaining member (lumbar base) 50 inside the backrest 3 between side frames 3f, that is, at a position behind the backrest surface 3s. The retaining member 50 in the seat device 30 of the present embodiment is made of flexible plastic. Furthermore, the retaining member 50 is supported by a structure F of the seat 1 provided by the side frames 3f with spring members 51 secured to a rear surface Sb of the retaining member 50. The spring members 51 of the present embodiment are provided by bending metal wire rods. In the seat device 30 of the present embodiment, three seat support devices (a shoulder support, a lumbar support, and a back pelvis support) 41 to 43 corresponding to the shoulder region, the lumbar region, and the lower end portion of the backrest 3 are integrally provided in such a manner as to share the retaining member 50.

As shown in FIG. 5B, the seat device 30 of the present embodiment includes a seat support inlet-outlet valve device 32 (52) and a massage inlet-outlet valve device 32 (53) provided on the rear surface Sb of the retaining member 50. The seat device 30 of the present embodiment is configured to perform suction and discharge of air with respect to the airbags 10 (11 to 14) for seat support and the airbags 20 (21 to 25) for massage provided in the backrest 3 through the air tubes 35 connected to the inlet-outlet valve devices 32.

Securing Structure of Inlet-Outlet Valve Device

Next, the structure in which the seat support inlet-outlet valve device 52 of the seat device 30 according to the present embodiment is secured to the retaining member 50 will be described.

As shown in FIGS. 6, 7, 8A and 8B, the seat support inlet-outlet valve device 52 of the seat device 30 according to the present embodiment includes a main body 54. The main body 54 has a substantially rectangular flat box-like outside shape. The inlet-outlet valve device 52 of the present embodiment also includes a first securing portion 55 located on a first end 54a of the main body 54 and a second securing portion 56 located on a second end 54b of the main body 54. Furthermore, the inlet-outlet valve device 52 is secured to the rear surface Sb of the retaining member 50 in a state in which the first securing portion 55 and the second securing portion 56 are arranged in the vertical direction. Thus, in the inlet-outlet valve device 52 of the present embodiment, the air tubes 35 are connected to sides 54c and 54d of the main body 54 facing the seat lateral direction (refer to FIG. 5B).

As shown in FIGS. 9A, 9B, 10A, and 10B, the first securing portion 55 and the second securing portion 56 of the inlet-outlet valve device 52 of the present embodiment are provided by securing a first mounting bracket 57 and a second mounting bracket 58 to the first end 54a and the second end 54b of the main body 54, respectively. The first mounting bracket 57 and the second mounting bracket 58 are bent plates that are substantially L-shaped.

More specifically, as shown in FIGS. 9A and 9B, the first mounting bracket 57 includes a substantially tabular extended portion 57a at a position substantially flush with a top plate 59 of the main body 54 facing the direction that is the same as the rear surface Sb of the retaining member 50 (leftward in FIGS. 9A and 9B). The extended portion 57a extends in the longitudinal direction of the main body 54 (upward in FIG. 9) from the first end 54a while opposing the rear surface Sb of the retaining member 50. Furthermore, as shown in FIGS. 10A and 10B, the second mounting bracket 58 includes a substantially tabular extended portion 58a at a position substantially flush with a bottom plate 60 of the main body 54 facing the rear surface Sb of the retaining member 50 (rightward in FIGS. 10A and 10B). The extended portion 58a extends in the longitudinal direction of the main body 54 (downward in FIGS. 10A and 10B) from the second end 54b while opposing the rear surface Sb of the retaining member 50. In the inlet-outlet valve device 52 of the present embodiment, the extended portion 57a of the first mounting bracket 57 and the extended portion 58a of the second mounting bracket 58 are configured to function as the first securing portion 55 and the second securing portion 56, respectively.

Figure 6:
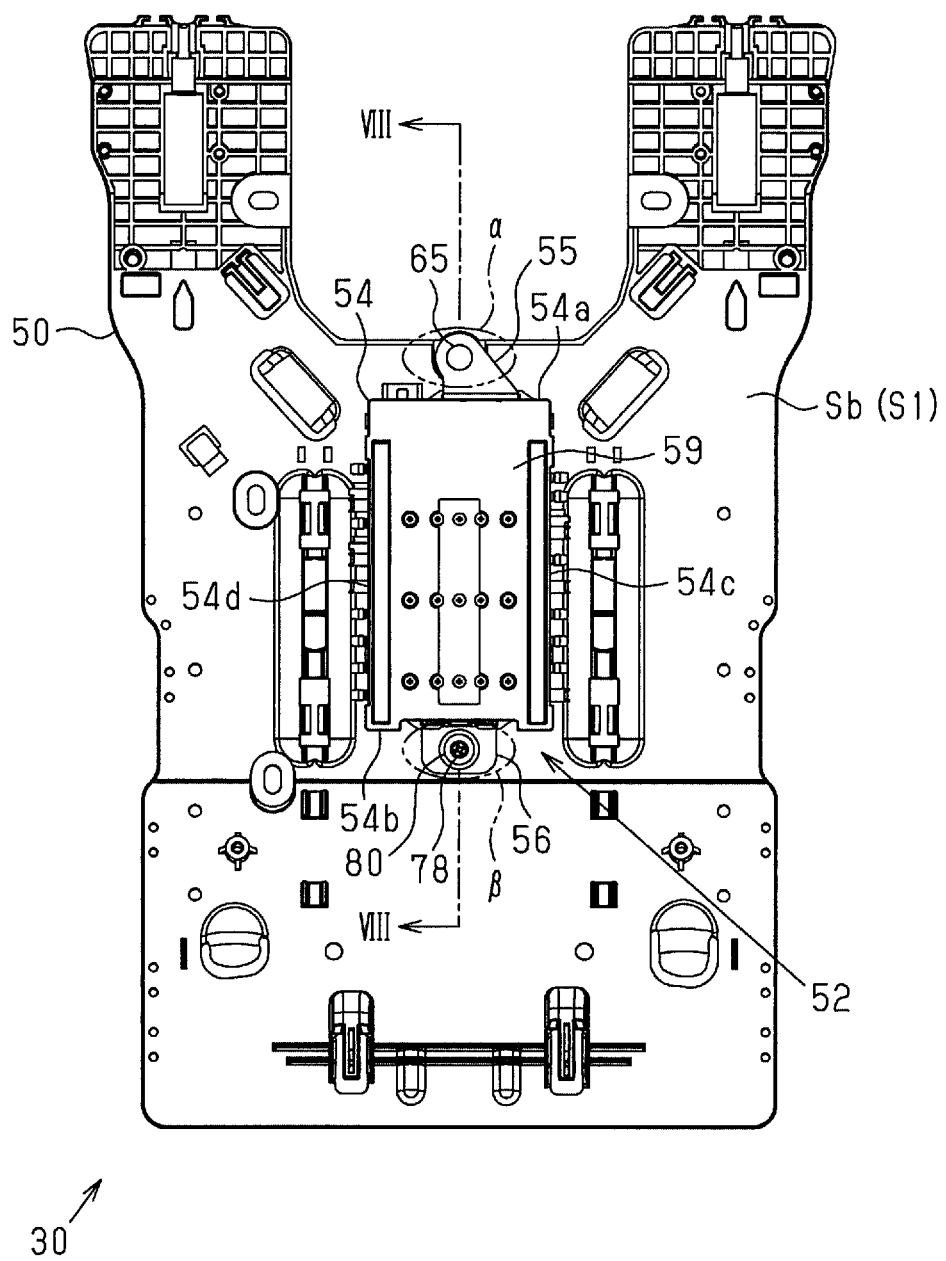
FIG. 6 is a rear view of the retaining member, to which an inlet-outlet valve device is secured.
Figure 7:
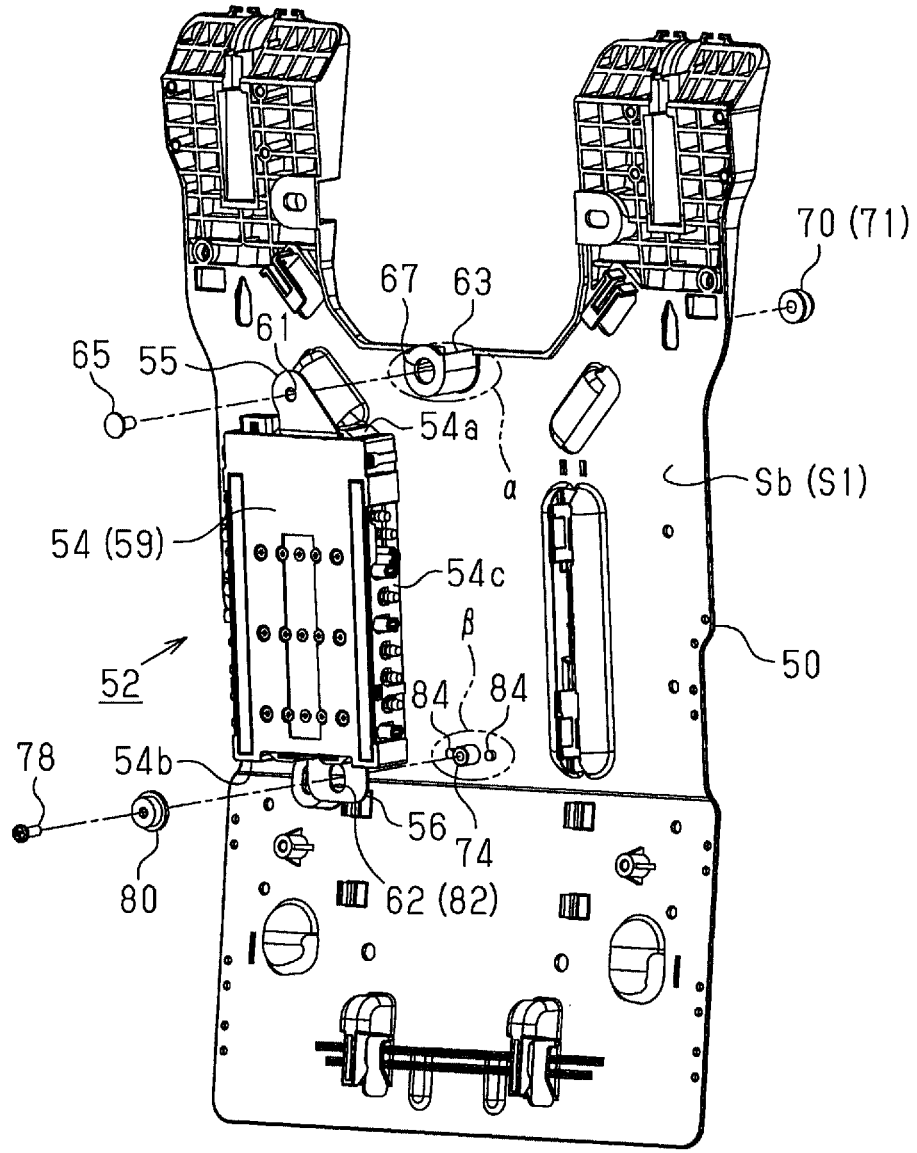
FIG. 7 is a perspective view of the inlet-outlet valve device and the retaining member.

Furthermore, as shown in FIGS. 6 and 7, the first securing portion 55 and the second securing portion 56 of the inlet-outlet valve device 52 of the present embodiment are secured to a first position α and a second position respectively. The first position α and the second position β are set at the middle portion of the rear surface Sb of the retaining member 50 in the seat lateral direction (refer to FIG. 6, the left and right direction in FIG. 6). More specifically, the first securing portion 55 and the second securing portion 56 of the inlet-outlet valve device 52 of the present embodiment include a first hole 61 and a second hole 62, respectively. The first hole 61 extends through the first securing portion 55 along the thickness, and the second hole 62 extends through the second securing portion 56 along the thickness. The inlet-outlet valve device 52 of the present embodiment is configured in such a manner that the first securing portion 55 and the second securing portion 56 are fastened to the first position α and the second position β, which are set on the retaining member 50, using the first hole 61 and the second hole 62.

More specifically, as shown in FIGS. 7 to 9B, a first screw fastening portion 63 is provided at the first position α on the retaining member 50 in the seat device 30 of the present embodiment. The first screw fastening portion 63 is used to fasten the first securing portion 55 of the inlet-outlet valve device 52 to the first position α. More specifically, the rear surface Sb of the retaining member 50 of the present embodiment is substantially flat. The rear surface Sb serves as a retaining surface S1 of the inlet-outlet valve device 52. In the retaining member 50 of the present embodiment, the first screw fastening portion 63 has a substantially semi-cylindrical outside shape and projects from the rear surface Sb of the retaining member 50. The first screw fastening portion 63 projects to fit the first securing portion 55 of the inlet-outlet valve device 52, which is provided to be substantially flush with the top plate 59. Furthermore, the first screw fastening portion 63 of the present embodiment has a flat section 63a at its top portion. The flat section 63a includes a through-hole 67, which receives a shaft portion (shank) 65a of a first screw 65 used to fasten the first securing portion 55.

In the seat device 30 of the present embodiment, the first screw 65 is inserted from the first securing portion 55 of the inlet-outlet valve device 52 (left side in FIGS. 9A and 9B) through the first hole 61 in the first securing portion 55 and in the through-hole 67 provided in the first screw fastening portion 63. The seat device 30 of the present embodiment also includes a nut member 70. The nut member 70 is screwed to the shaft portion 65a of the first screw 65 inserted in the first hole 61 of the first securing portion 55 and the through-hole 67 of the first screw fastening portion 63. That is, in the seat device 30 of the present embodiment, the first hole 61 in the first securing portion 55 of the inlet-outlet valve device 52 configures a first securing portion hole, and the through-hole 67 in the first screw fastening portion 63 of the retaining member 50 configures a first position hole. The inlet-outlet valve device 52 of the present embodiment is configured in such a manner that the first securing portion 55 is secured to the first position α on the retaining member 50 based on the fastening force generated when the first screw 65 and the nut member 70 are screwed together.

More specifically, as shown in FIGS. 9A and 9B, the seat device 30 of the present embodiment includes an elastic member 71, which is located between the first securing portion 55 of the inlet-outlet valve device 52 and the first screw fastening portion 63 of the retaining member 50. The nut member 70 of the present embodiment includes a nut portion 70a embedded inside the elastic member 71. The nut portion 70a is screwed to the shaft portion 65a of the first screw 65. The nut portion 70a and the elastic member 71 are integrated.

More specifically, the elastic member 71 of the present embodiment includes a cylindrical portion 71a through which the shaft portion 65a of the first screw 65 is inserted and a flange-shaped extended portion 71b, which extends radially outward of the cylindrical portion 71a at the end of the cylindrical portion 71a in the axial direction. The elastic member 71 includes a flange-shaped clamping portion 71c at a position separate from the extended portion 71b in the axial direction of the cylindrical portion 71a. The clamping portion 71c extends radially outward of the cylindrical portion 71a. The nut member 70 of the present embodiment is configured in such a manner that the nut portion 70a is embedded inside the cylindrical portion 71a at a position separate from the extended portion 71b in the axial direction like the clamping portion 71c.

The nut member 70 of the present embodiment is mounted to the first screw fastening portion 63 in such a manner that the cylindrical portion 71a of the elastic member 71 fits in the through-hole 67, which is provided in the first screw fastening portion 63 of the retaining member 50. When the shaft portion 65a of the first screw 65 is screwed to the nut portion 70a, which is embedded in the cylindrical portion 71a of the elastic member 71, the nut member 70 sandwiches the first securing portion 55 of the inlet-outlet valve device 52 and the flat section 63a of the first screw fastening portion 63 of the retaining member 50 between the clamping portion 71c of the cylindrical portion 71a and a head 65b of the first screw 65. Furthermore, the extended portion 71b of the elastic member 71 of the nut member 70 is sandwiched between the first securing portion 55 of the inlet-outlet valve device 52 and the first screw fastening portion 63 of the retaining member 50. The elastic member 71 of the nut member 70 of the present embodiment is located between the first securing portion 55 of the inlet-outlet valve device 52 and the first screw fastening portion 63 of the retaining member 50 and between the through-hole 67 in the first screw fastening portion 63 and the shaft portion 65a of the first screw 65 inserted in the through-hole 67.

That is, in the nut member 70 of the present embodiment, the elastic member 71, which covers the outer circumference of the nut portion 70a, is elastically deformed. The elastic deformation permits relative displacement between the first securing portion 55 of the inlet-outlet valve device 52 and the first screw fastening portion 63 of the retaining member 50 around the shaft portion 65a of the first screw 65, which is screwed to the nut portion 70a. More specifically, relative displacement between the first securing portion 55 and the first screw fastening portion 63 is permitted in the axial direction and the radial direction of the first screw 65. In the inlet-outlet valve device 52 of the present embodiment, this permits inclination of the inlet-outlet valve device 52 relative to the retaining member 50 with the first position α, at which the first screw fastening portion 63 is provided, serving as a fulcrum.

As shown in FIGS. 7, 8A, 8B, 10A, and 10B, a second screw fastening portion 74 is provided at the second position β on the retaining member 50 of the seat device 30 according to the present embodiment. The second screw fastening portion 74 is used to fasten the second securing portion 56 of the inlet-outlet valve device 52 to the second position β.

Figure 11:
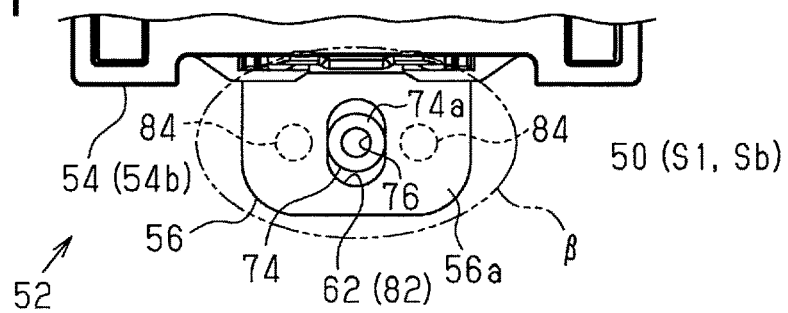
FIG. 11 is an enlarged view of a second screw fastening portion provided at the second position on the retaining member and a second hole (elongated hole) provided in the second securing portion of the inlet-outlet valve device.
Figure 12:
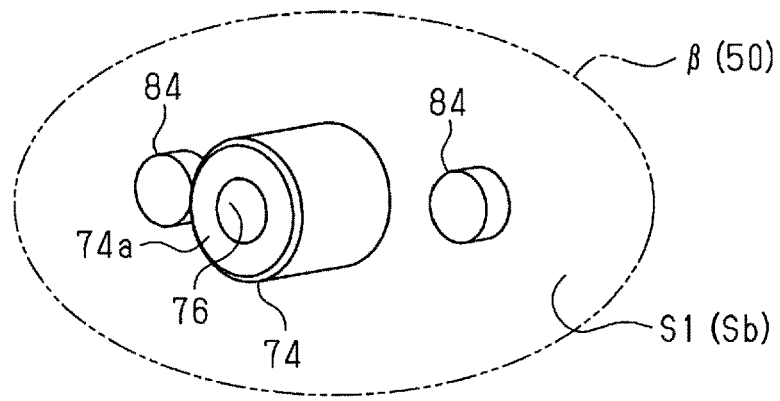
FIG. 12 is a perspective view of the second screw fastening portion and support projections provided at the second position on the retaining member.

As shown in FIGS. 11 and 12, the second screw fastening portion 74 of the retaining member 50 of the present embodiment has a substantially columnar shaft shape projecting from the rear surface Sb of the retaining member 50. The second screw fastening portion 74 corresponds to a shaft-shaped portion. The second screw fastening portion 74 also has a recess 76 at its axial end. Furthermore, as shown in FIGS. 7, 10A, and 10B, a second screw 78 is screwed to the recess 76. The second securing portion 56 of the inlet-outlet valve device 52 of the present embodiment is secured to the second position β on the retaining member 50 based on the fastening force generated when the second screw 78 is screwed to the second screw fastening portion 74.

More specifically, as shown in FIGS. 10A, 10B, and 11, the inlet-outlet valve device 52 of the present embodiment is mounted on the rear surface Sb of the retaining member 50 with the shaft-shaped second screw fastening portion 74 inserted in the second hole 62, which is provided in the second securing portion 56. As shown in FIGS. 7, 8A, 8B, 10A, and 10B, the inlet-outlet valve device 52 also includes a clamping member 80, which sandwiches the second securing portion 56 between the clamping member 80 and the second position β on the retaining member 50 based on the fastening force generated when the second screw 78 is screwed to the second screw fastening portion 74. In the inlet-outlet valve device 52 of the present embodiment, the second hole 62 of the second securing portion 56, through which the shaft-shaped second screw fastening portion 74 is inserted, corresponds to an elongated hole 82. The elongated hole 82 extends in a direction that connects the second securing portion 56 and the first securing portion 55 (the vertical direction in the drawings).

That is, in the seat device 30 of the present embodiment, the second screw fastening portion 74 functions as a second securing portion fastening member that secures the second securing portion 56 of the inlet-outlet valve device 52 to the second position β on the retaining member 50 when the second screw 78 is screwed. Furthermore, the second screw fastening portion 74 is capable of apparently moving in the elongated hole 82 against the fastening force generated when the second screw 78 is screwed to the second screw fastening portion 74, that is, the screwing force of the second screw 78 that sandwiches the second securing portion 56 of the inlet-outlet valve device 52 between the clamping member 80 and the retaining member 50. Thus, the seat device 30 of the present embodiment permits relative displacement between the second securing portion 56 of the inlet-outlet valve device 52 and the second position β on the retaining member 50 along the extending direction of the elongated hole 82. This allows the inlet-outlet valve device 52 to be retained in a stable manner.

Figure 8A:
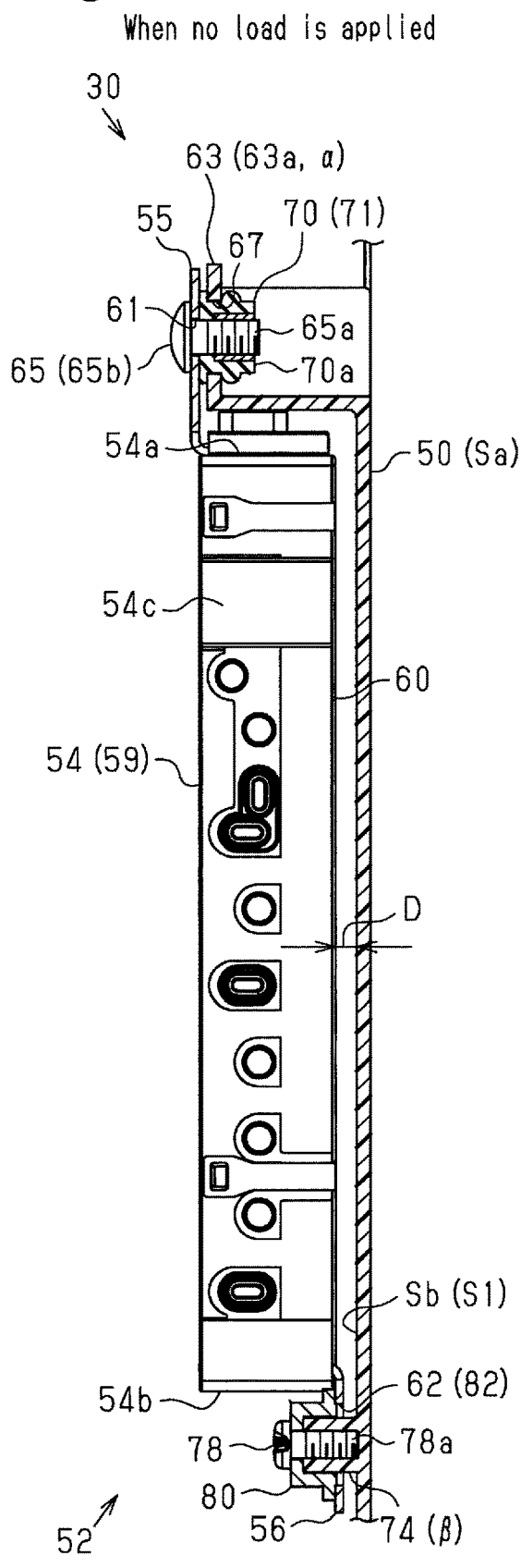
FIG. 8A is a cross-sectional view taken along line VIII-VIII in FIG. 6, illustrating a first securing portion and a second securing portion of the inlet-outlet valve device and the retaining member when no load is applied.

More specifically, as shown in FIGS. 11 and 12, a pair of support projections 84 is provided at the second position β on the retaining member 50 in the seat device 30 of the present embodiment. The support projections 84 project from the rear surface Sb of the retaining member 50 at positions that sandwich the second screw fastening portion 74 in the seat lateral direction (the left and right direction in FIG. 11). Furthermore, the second securing portion 56 of the inlet-outlet valve device 52 is located at the second position β on the retaining member 50 with a rear surface 56b abutting against the support projections 84. Thus, as shown in FIG. 8A, in the seat device 30 of the present embodiment, a gap D is provided between the main body 54 of the inlet-outlet valve device 52 and the rear surface Sb of the retaining member 50, which configures the retaining surface S1.

As shown in FIGS. 10A and 10B, the clamping member 80 of the present embodiment includes a cylindrical portion 80a, which accommodates the shaft-shaped second screw fastening portion 74, and a flange portion 80b, which is provided on one end of the cylindrical portion 80a in the axial direction (the right end in FIGS. 10A and 10B). Furthermore, the clamping member 80 includes a bottom plate 80c on the other end of the cylindrical portion 80a in the axial direction (the left end in the same drawings). The bottom plate 80c has a hole 86 through which a shaft portion 78a of the second screw 78 is inserted.

That is, the second screw 78 is screwed to the second screw fastening portion 74 of the retaining member 50 through the hole 86 provided in the bottom plate 80c of the clamping member 80 of the present embodiment. This secures the bottom plate 80c to a top portion 74a of the second screw fastening portion 74 with the second screw fastening portion 74 located inside the cylindrical portion 80a. Furthermore, the flange portion 80b, which extends radially outward of the cylindrical portion 80a of the clamping member 80, abuts against a surface 56a of the second securing portion 56. The clamping member 80 of the present embodiment secures the second securing portion 56 of the inlet-outlet valve device 52 to the second position β on the retaining member 50 by sandwiching the second securing portion 56 between the flange portion 80b and the support projections 84, which are provided on the rear surface Sb of the retaining member 50.

Next, operation of the structure in which the inlet-outlet valve device 52 is secured to the retaining member 50 configured as described above will be described.

Figure 8B:
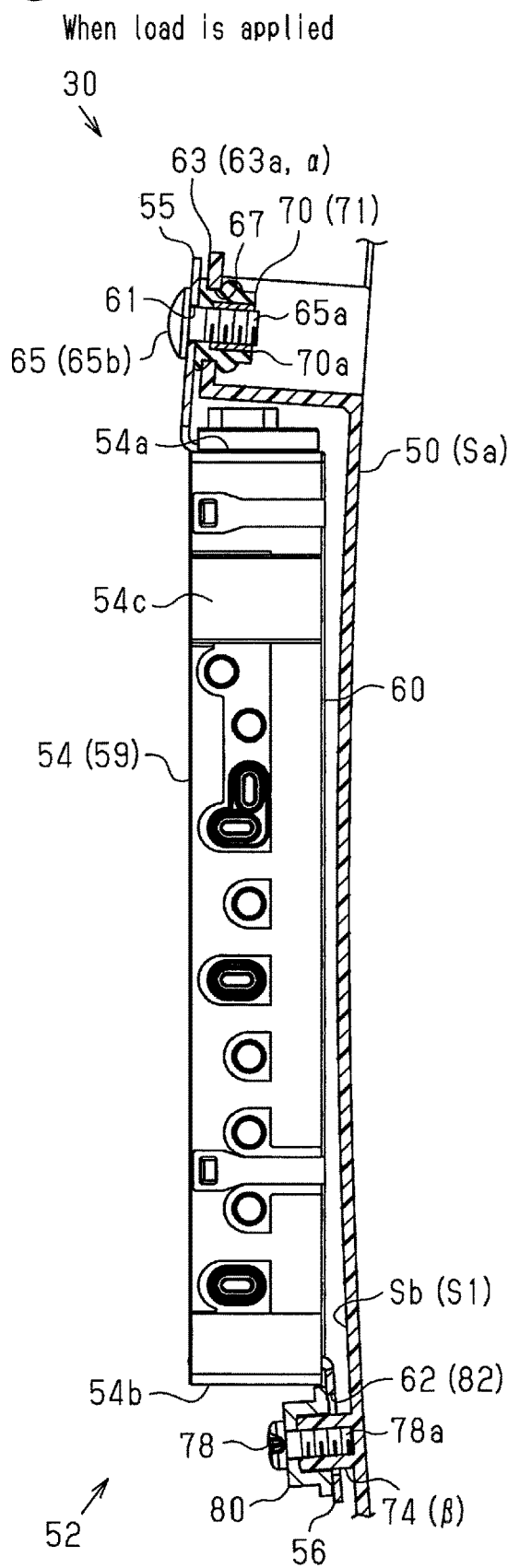
FIG. 8B is a cross-sectional view taken along line VIII-VIII in FIG. 6, illustrating the first securing portion and the second securing portion of the inlet-outlet valve device and the retaining member when a load is applied.

As shown in FIG. 8B, when, for example, the occupant leans onto the backrest surface 3s of the backrest 3, the retaining member 50, which is located inside the backrest 3, receives the seat load that presses the retaining member 50 rearward of the seat 1 (leftward in FIG. 8B) integrally with the backrest 3. This bends the retaining member 50 and thus changes the positional relationship between the first position α and the second position β, which are set on the rear surface Sb of the retaining member 50 to secure the inlet-outlet valve device 52 to the retaining member 50.

In such a case however, as shown in FIGS. 10A and 10B, the inlet-outlet valve device 52 of the present embodiment allows the second screw fastening portion 74 to apparently move in the elongated hole 82, which is provided in the second securing portion 56 of the inlet-outlet valve device 52, against the fastening force generated when the second screw 78 is screwed to the second screw fastening portion 74, which is provided at the second position β on the retaining member 50.

That is, the retaining member 50 of the present embodiment includes the first position α, to which the first securing portion 55 of the inlet-outlet valve device 52 is secured, and the second position β, to which the second securing portion 56 of the inlet-outlet valve device 52 is secured, at two positions on the rear surface Sb separate in the vertical direction of the retaining member 50. The rear surface Sb configures the retaining surface S1 along the backrest surface 3s of the backrest 3. Thus, as described above, when the second screw fastening portion 74 apparently moves in the elongated hole 82, relative displacement between the second securing portion 56 of the inlet-outlet valve device 52 and the second position β on the retaining member 50 in the vertical direction of the backrest 3 is permitted. Thus, the inlet-outlet valve device 52 of the present embodiment is configured to absorb the positional change in the first position α and the second position β caused when the retaining member 50 bends.

Additionally, as shown in FIGS. 9A and 9B, in the inlet-outlet valve device 52 of the present embodiment, the elastic member 71, which is located between the first securing portion 55 and the first screw fastening portion 63 at the first position α on the retaining member 50, is elastically deformed. This permits inclination of the inlet-outlet valve device 52 relative to the retaining member 50 with the first position α serving as the fulcrum. Thus, the positional change in the first position α and the second position β caused when the retaining member 50 is bent is more efficiently absorbed.

Furthermore, as shown in FIGS. 9A, 9B, 10A, and 10B, in the inlet-outlet valve device 52 of the present embodiment, the first securing portion 55 and the second securing portion 56, which have a substantially tabular outside shape and face the rear surface Sb of the retaining member 50, are bent with the sections joined to the main body 54 serving as the fulcrums. This permits inclination of the inlet-outlet valve device 52 relative to the retaining member 50 with the first securing portion 55 and the second securing portion 56 serving as the fulcrums. Thus, the positional change in the first position α and the second position caused when the retaining member 50 is bent is more efficiently absorbed.

The present embodiment achieves the following advantages.

(1) The inlet-outlet valve device 52 includes the main body 54, to which the air tubes 35 are connected, the first securing portion 55, and the second securing portion 56. The air tubes 35 have the air flow passage L. The first securing portion 55 and the second securing portion 56 are secured to the retaining member 50, which is located inside the seat 1. The first securing portion 55 is secured to the first position α on the retaining member 50. The shaft-shaped second screw fastening portion 74 is provided at the second position β on the retaining member 50. The second screw fastening portion 74 functions as the second securing portion fastening member when the second screw 78 is screwed to the second screw fastening portion 74. Furthermore, the second securing portion 56 includes the second hole 62, which is the insertion hole through which the second screw fastening portion 74 is inserted. The second hole 62 is configured as the elongated hole 82, which extends in the direction to connect the first securing portion 55 and the second securing portion 56.

According to the above configuration, the second screw fastening portion 74, which is located at the second position β on the retaining member 50, apparently moves in the elongated hole 82, which is provided in the second securing portion 56 of the inlet-outlet valve device 52 against the fastening force generated by the second securing portion fastening member, which is the second screw fastening portion 74 in this embodiment. That is, even if the retaining member 50 is bent due to application of the seat load, relative displacement between the second position on the retaining member 50 and the second securing portion 56 of the inlet-outlet valve device 52 is permitted in the extending direction of the elongated hole 82, that is, in the direction that connects the first securing portion 55 and the second securing portion 56 of the inlet-outlet valve device 52. This absorbs the positional change between the first position α and the second position β caused when the retaining member 50 is bent.

Furthermore, since the inlet-outlet valve device 52 is secured to the retaining member 50 at two positions including the first securing portion 55 and the second securing portion 56, even if the retaining member 50 is bent in the direction orthogonal to the direction that connects the first securing portion 55 and the second securing portion 56, the configuration is advantageous in that it resists being influenced by the deformation in this direction. This ensures the inlet-outlet valve device 52, which is secured to the retaining member 50, to be retained in a stable manner.

(2) The first securing portion 55 is secured to the first position α on the retaining member 50 via the elastic member 71.

According to the above configuration, the elastic deformation of the elastic member 71, which is located between the first securing portion 55 of the inlet-outlet valve device 52 and the first position α on the retaining member 50, permits displacement of the first securing portion 55 relative to the first position α. Thus, the positional change in the first position α and the second position β caused when the retaining member 50 is bent is more efficiently absorbed.

(3) The inlet-outlet valve device 52 includes the clamping member 80, which sandwiches the second securing portion 56 between the clamping member 80 and the retaining member 50 based on the fastening force generated by the second securing portion fastening member, which is the second screw fastening portion 74 in this embodiment.

That is, the second securing portion 56 is secured to the second position on the retaining member 50 in a more stable manner by applying the fastening force to the second securing portion 56 via the clamping member 80. When the retaining member 50 is bent, the motion of the second screw fastening portion 74 that apparently moves in the elongated hole 82, which is provided in the second securing portion 56, against the fastening force is also made smooth.

(4) The clamping member 80 includes the cylindrical portion 80a, which accommodates the second screw fastening portion 74, the flange portion 80b, which is provided on one end of the cylindrical portion 80a in the axial direction, and the bottom plate 80c, which is provided on the other end of the cylindrical portion 80a in the axial direction. The second screw 78 is screwed to the top portion 74a of the second screw fastening portion 74, so that the bottom plate 80c of the clamping member 80 is secured to the top portion 74a of the second screw fastening portion 74. The flange portion 80b, which extends radially outward of the cylindrical portion 80a of the clamping member 80, abuts against the second securing portion 56.

According to the above configuration, the fastening force applied to the second securing portion 56 via the clamping member 80 is made uniform regardless of the screwing force (amount of force) when the second screw 78 is screwed to the second screw fastening portion 74. Thus, the second securing portion 56 is secured to the second position β on the retaining member 50 in a more stable manner, and when the retaining member 50 is bent, the motion of the second screw fastening portion 74 that apparently moves in the elongated hole 82, which is provided in the second securing portion 56, against the fastening force is made smoother.

Since the second screw fastening portion 74 is located inside the cylindrical portion 80a, the second screw fastening portion 74 is protected. Furthermore, since the flange portion 80b, which abuts against the second securing portion 56, covers the elongated hole 82, foreign matter is prevented from entering the elongated hole 82. This increases reliability.

(5) The first securing portion hole, which is the first hole 61 in this embodiment, is provided in the first securing portion 55 of the inlet-outlet valve device 52. The first position hole, which is the through-hole 67 in this embodiment, is provided in the first position α on the retaining member 50. The first securing portion 55 is secured to the first position α on the retaining member 50 based on the fastening force generated by a first securing portion fastening member, which is the first screw 65 in this embodiment. The first screw 65 has the shaft portion (shank) 65a to be inserted in the first hole 61 and the through-hole 67. The elastic member 71 includes the cylindrical portion 71a and the extended portion 71b. The cylindrical portion 71a is fitted to the through-hole 67, which is provided at the first position α on the retaining member 50. The shaft portion 65a of the first screw 65 is inserted in the cylindrical portion 71a. The extended portion 71b extends radially outward of the cylindrical portion 71a at the end of the cylindrical portion 71a in the axial direction to be sandwiched between the first securing portion 55 and the first position α on the retaining member 50.

According to the above configuration, the elastic member 71 is located between the first securing portion 55 of the inlet-outlet valve device 52 and the first position α on the retaining member 50 in the direction along the shaft portion 65a of the first screw 65 and between the shaft portion 65a and the first position α on the retaining member 50 (the through-hole 67) in the radial direction of the shaft portion 65a. The above-described configuration is easy to mount and simple. As a result, when the elastic member 71 is elastically deformed, relative displacement between the first securing portion 55 of the inlet-outlet valve device 52 and the first position α on the retaining member 50 is permitted in the axial direction and the radial direction of the first screw 65. Since the inlet-outlet valve device 52 is tiltable with respect to the retaining member 50 with the first position α serving as the fulcrum, the positional change in the first position α and the second position β caused when the retaining member 50 is bent is more efficiently absorbed.

(6) The elastic member 71 includes the nut portion 70a and the clamping portion 71c. The nut portion 70a is embedded in the cylindrical portion 71a. The clamping portion 71c sandwiches the first securing portion 55 of the inlet-outlet valve device 52 and the first position α on the retaining member 50 between the clamping portion 71c and the head 65b of the first screw 65 with the extended portion 71b in between by screwing the shaft portion 65a of the first screw 65 to the nut portion 70a.

According to the above configuration, when the shaft portion 65a of the first screw 65 is screwed to the nut portion 70a, the elastic member 71 functions as the nut member 70, which generates the fastening force that secures the first securing portion 55 of the inlet-outlet valve device 52 to the first position α on the retaining member 50. That is, the elastic member 71 is integrally formed with the nut member 70. This simplifies the configuration and thus increases the efficiency of the mounting operation.

(7) The first securing portion 55 and the second securing portion 56 of the inlet-outlet valve device 52 are flexible and shaped like plates that face the rear surface Sb of the retaining member 50.

According to the above configuration, when the retaining member 50 is bent due to application of the seat load, the first securing portion 55 and the second securing portion 56 of the inlet-outlet valve device 52 bend with the sections joined to the main body 54 serving as the fulcrums to permit the inlet-outlet valve device 52 to tilt relative to the retaining member 50. Thus, the positional change in the first position α and the second position β caused when the retaining member 50 is bent is more efficiently absorbed.

(8) The retaining member 50 provides the retaining surface S1 (the rear surface Sb) along the backrest surface 3s of the backrest 3. The inlet-outlet valve device 52 is secured to the retaining surface S1 of the retaining member 50 with the first securing portion 55 and the second securing portion 56 arranged in the vertical direction of the backrest 3.

That is, the retaining member 50 is located at the position that provides the retaining surface S1, which extends along the backrest surface 3s of the backrest 3, that is, at the position on the rear side of the backrest surface 3s. This provides high flexibility in the layout. The retaining member 50, which is located inside the backrest 3, receives the seat load that presses the retaining member 50 rearward of the seat 1 integrally with the backrest 3. However, the above configuration permits relative displacement between the second securing portion 56 of the inlet-outlet valve device 52 and the second position β on the retaining member 50 in the vertical direction of the backrest 3. Thus, the positional change in the first position α and the second position β caused when the retaining member 50 is bent is absorbed.

(9) The gap D is provided between the main body 54 of the inlet-outlet valve device 52 and the rear surface Sb of the retaining member 50, which serves as the retaining surface S1 for the inlet-outlet valve device 52. With this configuration employed, the retaining member 50 that is bent by the application of the seat load is prevented from touching the main body 54 of the inlet-outlet valve device 52. As a result, the inlet-outlet valve device 52 is retained in a more stable manner.

The above-described embodiment may be modified as follows.

In the above-described embodiment, when the nut member 70 is screwed to the shaft portion 65a, the first securing portion fastening member, which is the first screw 65 in this embodiment, generates the fastening force that secures the first securing portion 55 of the inlet-outlet valve device 52 to the first position α on the retaining member 50. The nut member 70 has an integrated structure in which the nut portion 70a is embedded inside the elastic member 71.

Figure 13:
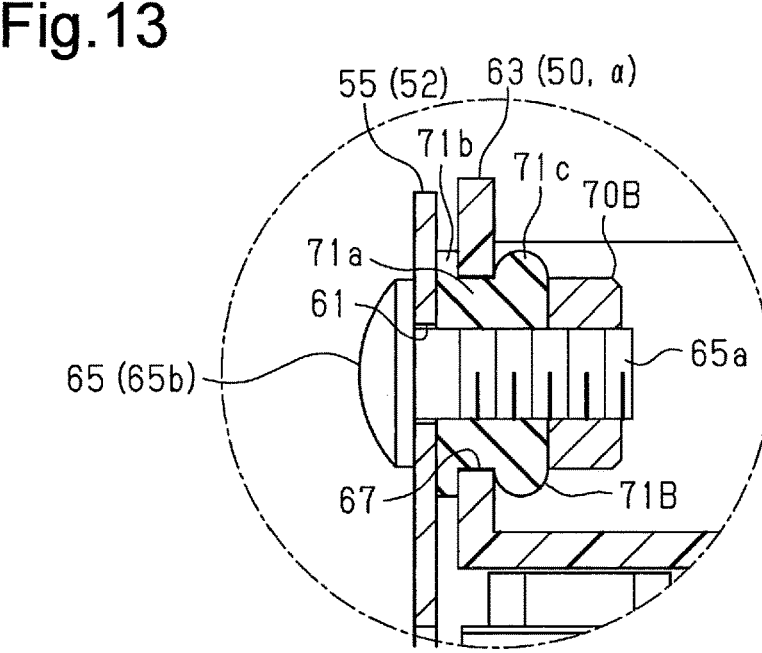
FIG. 13 is a diagram illustrating a modification of the structure by which the first securing portion is secured to the first position on the retaining member.

However, the configuration is not limited to this. For example, as shown in FIG. 13, a nut member 70B and an elastic member 71B may be separately provided. With this configuration also, advantages are provided that are the same as the above-described embodiment.

Figure 14:
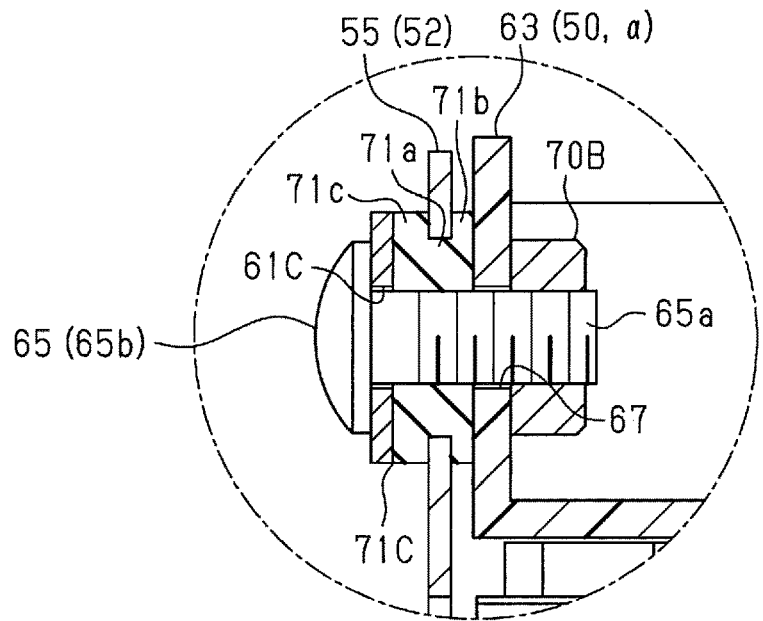
FIG. 14 is a diagram illustrating another modification of the structure by which the first securing portion is secured to the first position on the retaining member.

As shown in FIG. 14, the cylindrical portion 71a of an elastic member 71C may be fitted to a first hole 61C, which serves as the first securing portion hole provided in the first securing portion 55 of the inlet-outlet valve device 52. In the elastic member 71C shown in this example, the clamping portion 71c is configured to sandwich the first securing portion 55 of the inlet-outlet valve device 52 between the clamping portion 71c and the extended portion 71b. Furthermore, the cylindrical portion 71a may be fitted to both the first securing portion hole and the first position hole. With this configuration also, advantages are provided that are the same as the above-described embodiment.

Furthermore, as long as the relative displacement between the first position α on the retaining member 50 and the first securing portion 55 of the inlet-outlet valve device 52 is permitted, the shape and the material of the elastic member located between the first securing portion 55 and the first position α on the retaining member 50 may be changed as required. The first securing portion fastening member, which secures the first securing portion 55 of the inlet-outlet valve device 52 to the first position α on the retaining member 50, does not necessarily have to be the screw, but may be, for example, any fastening member such as a rivet. However, in order to permit the inlet-outlet valve device 52 to tilt relative to the retaining member 50 with the first position α serving as the fulcrum, it is preferable to use a fastening member having a shaft portion and to employ a structure in which an elastic member is located between the shaft portion and at least one of the first securing portion 55 and the first position α on the retaining member 50 in the radial direction of the shaft portion.

In the above-described embodiment, the substantially semi-cylindrical first screw fastening portion 63, which projects from the retaining surface S1 (the rear surface Sb) of the retaining member 50, is provided at the first position α on the retaining member 50. The first position hole, which is the through-hole 67 in this embodiment, is formed in the flat section 63a provided at the top portion of the first screw fastening portion 63. However, the configuration is not limited to this. The shape of the retaining member 50 at the first position α may be changed as required. Furthermore, the first securing portion 55 may be secured to the first position α on the retaining member 50 via the elastic member by a method other than fastening. The elastic member does not necessarily have to be located between the first securing portion 55 and the first position α on the retaining member 50. In this case, however, it is desirable that, for example, the first securing portion 55 is flexible so that the inlet-outlet valve device 52 is permitted to tilt relative to the retaining member 50 with the first securing portion 55 serving as the fulcrum.

In the above-described embodiment, the shaft-shaped (substantially columnar) second screw fastening portion 74, which projects on the retaining surface S1 (the rear surface Sb) of the retaining member 50, is provided at the second position on the retaining member 50. The second screw fastening portion 74 is inserted in the elongated hole (the second hole 62), which is provided at the second securing portion 56 of the inlet-outlet valve device 52. When the second screw 78 is screwed to the top portion 74a of the second screw fastening portion 74, the second screw fastening portion 74 functions as the second securing portion fastening member that generates the fastening force that secures the second securing portion 56 of the inlet-outlet valve device 52 to the second position β on the retaining member 50.

Figure 15:
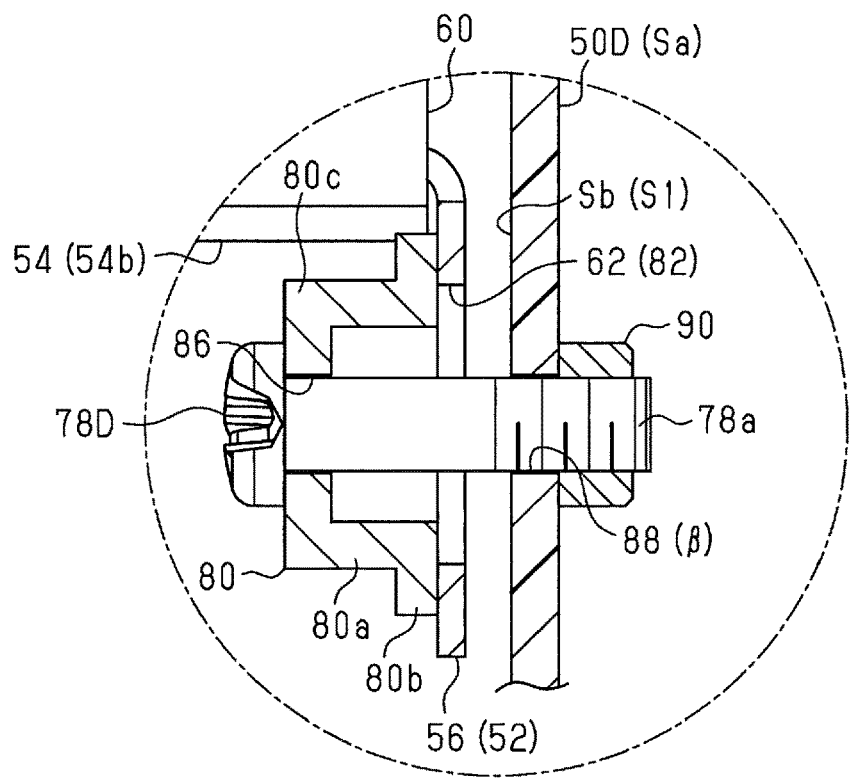
FIG. 15 is a diagram illustrating a modification of the structure by which the second securing portion is secured to the second position on the retaining member.

However, the configuration is not limited to this. For example, as shown in FIG. 15, a hole 88 is provided at the second position β on a retaining member 50D. The shaft portion 78a of a second screw 78D is inserted in the hole 88. Furthermore, a nut member 90 is screwed to the shaft portion 78a of the second screw 78D inserted in the hole 88 from the side of the front surface Sa of the retaining member 50D (the right side in FIG. 15). That is, the second screw 78D is screwed to the retaining member 50D via the clamping member 80. Thus, the bottom plate 80c is secured between the head of the second screw 78D and the flange portion 80b, and the flange portion 80b, which extends radially outward of the cylindrical portion 80a, abuts against the second securing portion 56. The second securing portion 56 of the inlet-outlet valve device 52 may be secured to the second position β on the retaining member 50D by the fastening force generated by the second screw 78D and the nut member 90. That is, with this configuration employed, the second screw 78D functions as the second securing portion fastening member. Thus, advantages are provided that are the same as the above-described embodiment.

Figure 16:
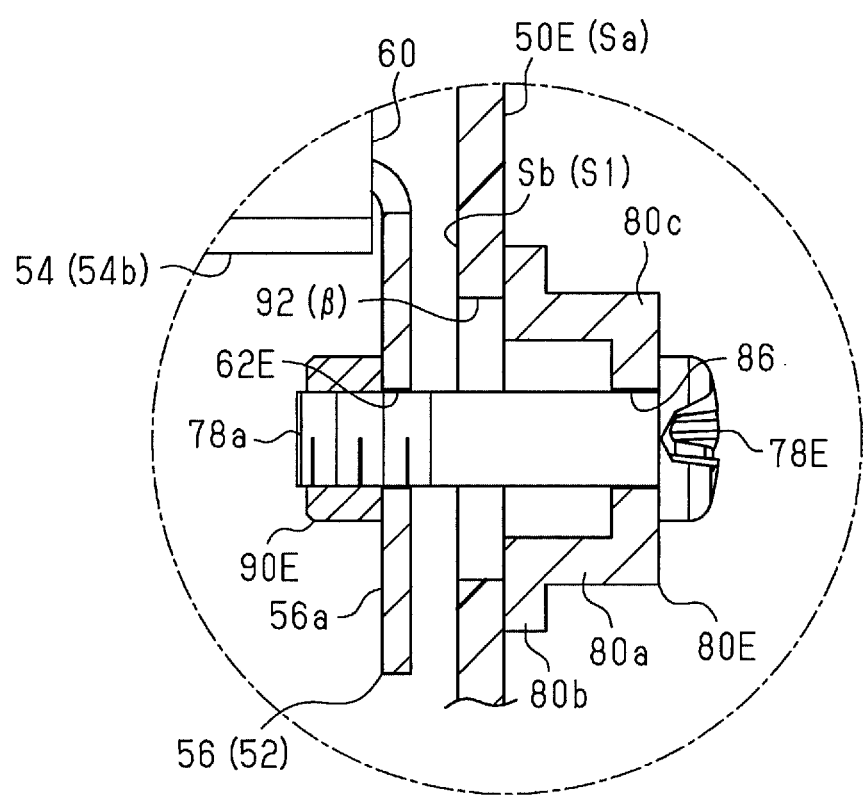
FIG. 16 is a diagram illustrating another modification of the structure by which the second securing portion is secured to the second position on the retaining member.

As shown in FIG. 16, an elongated hole 92 may be provided at the second position β on a retaining member 50E. The elongated hole 92 extends in a direction that connects the second position and the first position α (the vertical direction in FIG. 16), that is, a direction that connects the first securing portion 55 and the second securing portion 56 of the inlet-outlet valve device 52. The shaft portion 78a of a second screw 78E, which configures the second securing portion fastening member, may be inserted in the elongated hole 92. With this configuration also, advantages are provided that are the same as the above-described embodiment.

More specifically, in the example shown in FIG. 16, a second hole 62E is provided in the second securing portion 56 of the inlet-outlet valve device 52. The second hole 62E has substantially the same diameter as (slightly larger diameter than) the shaft portion 78a of the second screw 78E. The shaft portion 78a of the second screw 78E is inserted in the elongated hole 92 of the retaining member 50E and the second hole 62E of the second securing portion 56 from the side of the front surface Sa of the retaining member 50E (the right side in FIG. 16) and is screwed to a nut member 90E on the surface 56a of the second securing portion 56 (the left side in FIG. 16). That is, the second screw 78E is screwed to the second securing portion 56 via the clamping member 80E. Thus, the bottom plate 80c is secured between the head of the second screw 78E and the flange portion 80b, and the flange portion 80b, which extends radially outward of the cylindrical portion 80a, abuts against the retaining member 50E. Furthermore, in this example, the clamping member 80E also abuts against the front surface Sa of the retaining member 50E. Thus, the second screw 78E sandwiches the retaining member 50E between the second screw 78E and the second securing portion 56 of the inlet-outlet valve device 52.

In this case also, the second securing portion fastening member, which is the second screw 78E in this embodiment, may be inserted in the second hole 62E, which is provided in the second securing portion 56, and the elongated hole 92, which is provided in the second position on the retaining member 50E, from the second securing portion 56 of the inlet-outlet valve device 52. Furthermore, the clamping member 80E may be located in the same manner as in the modified embodiment of FIG. 15. That is, the clamping member 80E may be located at a diametrically opposed position in FIG. 16 in such a manner that the flange portion 80b abuts against the second securing portion 56. A shaft-shaped portion similar to the second screw fastening portion 74 of the above-described embodiment may be provided at the second securing portion 56 of the inlet-outlet valve device 52. The shaft-shaped portion may be inserted in the elongated hole 92, which is provided in the second position β on the retaining member 50E, so that the shaft-shaped portion configures the second securing portion fastening member.

Furthermore, the shape of the clamping member 80 (80E) may be changed as required. For example, the clamping member 80 (80E) does not necessarily have to cover the entire elongated hole 82 (92). Furthermore, the second screw fastening portion 74 or the shaft portion 78a inserted in the elongated hole 82 (92) does not necessarily have to be located inside the clamping member 80 (80E). The clamping member 80 may be omitted.

In the above-described embodiment, the inlet-outlet valve device 52 is secured to the retaining surface S1 of the retaining member 50 in a state in which the first securing portion 55 and the second securing portion 56 are arranged in the vertical direction of the backrest 3. However, the configuration is not limited to this. For example, the invention may be applied to a configuration in which the first securing portion 55 and the second securing portion 56 are arranged in the seat lateral direction. The inlet-outlet valve device 52 may include three or more securing portions secured to the retaining member 50.

Furthermore, in the above-described embodiment, the inlet-outlet valve device 52 is secured to the retaining member 50 with the rear surface Sb of the retaining member 50 serving as the retaining surface S1. However, the configuration is not limited to this. The front surface Sa of the retaining member 50 may serve as the retaining surface S1 of the inlet-outlet valve device 52. Furthermore, the retaining member 50 does not necessarily have to have the retaining surface S1 located along the backrest surface 3s of the backrest 3 as described above. For example, the configuration inside the seat cushion 2 and the configuration of the retaining member 50 such as the arrangement and the shape may be changed as required.

In the above-described embodiment, the invention is embodied in the securing structure of the seat support inlet-outlet valve device 52. However, for example, the invention may be applied to the inlet-outlet valve device 32 for other uses such as the massage inlet-outlet valve device (refer to FIG. 5B, located below the seat support inlet-outlet valve device 52).

The invention claimed is:

1. An inlet-outlet valve device comprising:
a main body configured in such a manner that an air tube having an air flow passage is coupled to the main body; and
a first securing portion and a second securing portion secured to a retaining member located inside a seat, wherein
the first securing portion is secured to a first position on the retaining member with a first securing portion fastening member,
the second securing portion is secured to a second position on the retaining member via a second securing portion fastening member, the second securing portion including an insertion hole through which the second securing portion fastening member is inserted, and
the insertion hole is an elongated hole extending in a direction that connects the first securing portion and the second securing portion to each other.

2. The inlet-outlet valve device according to claim 1, wherein the first securing portion is secured to the first position on the retaining member via an elastic member.

3. The inlet-outlet valve device according to claim 2, wherein
the first securing portion is secured to the first position on the retaining member based on a fastening force of the first securing portion fastening member,
the first securing portion fastening member includes a shaft portion, and
the elastic member is located between the first securing portion and the first position on the retaining member in a direction along the shaft portion of the first securing portion fastening member and between the shaft portion and at least one of the first securing portion and the first position on the retaining member in a radial direction of the shaft portion.

4. The inlet-outlet valve device according to claim 1, further comprising a clamping member that sandwiches the second securing portion between the clamping member and the retaining member based on a fastening force of the second securing portion fastening member.

5. The inlet-outlet valve device according to claim 1, wherein at least one of the first securing portion and the second securing portion is flexible and plate-shaped and faces the retaining member.

6. The inlet-outlet valve device according to claim 2, wherein the elastic member includes
a cylindrical portion that is fitted to at least one of a first securing portion hole provided in the first securing portion and a first position hole provided in the first position on the retaining member, the cylindrical portion receiving a shaft portion of the first securing portion fastening member, and an extended portion that extends radially outward of the cylindrical portion and is sandwiched between the first securing portion and the retaining member.

7. The inlet-outlet valve device according to claim 2, wherein
the first securing portion fastening member is a screw, and the elastic member includes
a nut portion embedded in the cylindrical portion, and
a clamping portion that sandwiches the first securing portion and the retaining member between the clamping portion and a head of the screw with the extended portion in between by screwing the screw to the nut portion.

8. The inlet-outlet valve device according to claim 4, wherein
the second securing portion fastening member is a shaft-shaped portion that is inserted in the elongated hole and includes a top portion to which a screw is screwed,
the clamping member includes
a cylindrical portion that accommodates the shaft-shaped portion,
a flange portion that is provided on one end of the cylindrical portion in an axial direction, and
a bottom plate that is provided on the other end of the cylindrical portion in the axial direction, and
when the screw is screwed to the top portion of the shaft-shaped portion, the bottom plate is secured to the top portion of the shaft-shaped portion, and the flange portion that extends radially outward of the cylindrical portion abuts against the second securing portion.

9. The inlet-outlet valve device according to claim 4, wherein
the second securing portion fastening member is a screw that includes a shaft portion to be inserted in the elongated hole,
the clamping member includes
a cylindrical portion that accommodates the shaft portion of the screw,
a flange portion that is provided on one end of the cylindrical portion in an axial direction, and
a bottom plate that is provided on the other end of the cylindrical portion in the axial direction, and
when the screw is screwed via the clamping member, the bottom plate is secured between a head of the screw and the flange portion, and the flange portion, which extends radially outward of the cylindrical portion, abuts against the second securing portion.

10. A vehicle seat device comprising the inlet-outlet valve device according to claim 1.

11. A vehicle seat device comprising:
a retaining member located inside a seat; and
an inlet-outlet valve device retained by the retaining member, wherein
the inlet-outlet valve device includes
a main body to which an air tube having an air flow passage is coupled, and
a first securing portion and a second securing portion secured to the retaining member,
the first securing portion is secured to a first position on the retaining member with a first securing portion fastening member,
the second securing portion is secured to a second position on the retaining member via a second securing portion fastening member,
the second position on the retaining member or the second securing portion includes an insertion hole, the second securing portion fastening member, which secures the second securing portion to the second position, is inserted in the insertion hole, and
the insertion hole extends in a direction that connects the first securing portion and the second securing portion.

12. The vehicle seat device according to claim 11, wherein
the retaining member forms a retaining surface along a backrest surface of a backrest, and
the inlet-outlet valve device is secured to the retaining surface in a state in which the first securing portion and the second securing portion are arranged in a vertical direction of the backrest.

13. The vehicle seat device according to claim 11, wherein a gap is provided between the main body and the retaining surface of the retaining member to which the first securing portion and the second securing portion are secured.

* * * * *